US 008082224B2

(12) United States Patent
Marinescu

(10) Patent No.: US 8,082,224 B2
(45) Date of Patent: Dec. 20, 2011

(54) SYSTEMS AND METHODS TO PROVIDE BUSINESS INFORMATION VIA A PUSH MODEL

(75) Inventor: Dan C. Marinescu, Putcaux (FR)

(73) Assignee: Business Objects S.A., Levallois-Perret (FR)

( * ) Notice: Subject to any disclaimer, the term of this patent is extended or adjusted under 35 U.S.C. 154(b) by 425 days.

(21) Appl. No.: 12/173,951

(22) Filed: Jul. 16, 2008

(65) Prior Publication Data

US 2010/0017384 A1 Jan. 21, 2010

(51) Int. Cl.
*G06F 7/00* (2006.01)
(52) U.S. Cl. .......................... 707/617; 707/628; 707/632
(58) Field of Classification Search ........................ None
See application file for complete search history.

(56) References Cited

U.S. PATENT DOCUMENTS

| | | | | |
|---|---|---|---|---|
| 2008/0212616 A1* | 9/2008 | Augustine et al. | ............ | 370/503 |
| 2009/0037533 A1* | 2/2009 | Gilfix et al. | .................... | 709/205 |
| 2009/0327354 A1* | 12/2009 | Resnick et al. | ............... | 707/201 |
| 2010/0211861 A1* | 8/2010 | Onda et al. | .................... | 715/205 |

OTHER PUBLICATIONS

Wikipedia, the free encyclopedia, "Complex Event Processing" Retrieved Jul. 2, 2008. Retrieved from Internet: URL:http://en.wikipedia.org/wiki/Complex_Event_Processing, 2pgs.
The Complex Event Processing Resource Site, "Complex Event Processing: A New computer Model", Retrieved Jul. 2, 2008, Retrieved from Internet: URL: http://www.eventstreamprocessing.com/index.htm, 1 pg.
Event processing use cases, "Applications of CEP", Retrieved Jul. 2, 2008, Retrieved from Internet: URL:http://www.eventstreamprocessing.com/CEPApplications.htm, 4pgs.
Thomas Bernhardt and Alexandre Vasseur. "Complex Event Processing Made Simple Using Esper", Apr. 2008, Enterprise Java Community, Retrieved Jul. 2, 2008, Retrieved from Internet: URL:http://www.theserverside.com/tt/articles/article.tss?I =ComplexEventProcessing, 5pgs.
"Complex Event Processing", Steambase, Retrieved Jul. 2, 2008. Retrieved from Internet: URL: http://www.streambase.com/complex-event-processing.htm, 4pgs.
"Complex Event Processing Tutorial", Retrieved Jul. 2, 2008. Retrieved from Internet URL: http://www.eventstreamprocessing.com/CEP-tutorial.htm, 2pgs.
Gideon Low and Jags Ramnarayan, "Java Feature—Building Real-Time Applications with Continuous Query Technology", Aug. 28, 2006 05:30PM, Retrieved Jul. 2, 2008. Retrieved from Internet: URL: http://java.sys-con.com/read/260054_2.htm, 5pgs.

(Continued)

*Primary Examiner* — Vei-Chung Liang
(74) *Attorney, Agent, or Firm* — Buckley, Maschoff & Talwalkar LLC

(57) ABSTRACT

A system, method, means, and/or computer program code may be provided to facilitate a presentation of business information to a user. According to some embodiments, a request from a client is received at a server, and the request is associated with a query. The server also receives notifications associated with business information and may block a connection with the client and/or a response to the request based on a determination that the business information does not currently satisfy a condition associated with the query (e.g., no such notification has been received). The server may subsequently determine the business information has changed and now satisfies the condition (e.g., when a notification is received). In this case, the server may unblock the connection and transmit a response, including new resulting data associated with the query, to the client.

12 Claims, 12 Drawing Sheets

OTHER PUBLICATIONS

Lars Brenna and Dag Jahansen, "Configuring Push-Based Web Services", Aug. 22, 2005, IEEE Computer Society, Proceedings of the International Conference on Next Generation Web Services Practices (NWebSP'05), 0-7695-2452-4, Copyright 2005 IEEE, 6pgs.

* cited by examiner ns information, business intelligence, and/or enterprise systems. In particular, some embodiments relate to systems and methods to provide a push model associated with business information, such as business intelligence and/or enterprise system data.

SYSTEMS AND METHODS TO PROVIDE BUSINESS INFORMATION VIA A PUSH MODEL

CROSS-REFERENCE TO RELATED APPLICATIONS

The present application is related to the following U.S. patent applications filed concurrently herewith: (i) U.S. patent application Ser. No. 12/173,979 entitled "SYSTEMS AND METHODS TO CREATE CONTINUOUS QUERIES VIA A SEMANTIC LAYER", and (ii) U.S. patent application Ser. No. 12/173,997 entitled "SYSTEMS AND METHODS TO CREATE CONTINUOUS QUERIES ASSOCIATED WITH PUSH-TYPE AND PULL-TYPE DATA". The entire contents of those applications are incorporated herein by reference.

FIELD

Some embodiments of the present invention relate to business information, business intelligence, and/or enterprise systems. In particular, some embodiments relate to systems and methods to provide a push model associated with business information, such as business intelligence and/or enterprise system data.

BACKGROUND

A business intelligence and/or enterprise system can improve an organization's ability to monitor and manage data in a complex business environment. For example, the systems offered by Business Objects SA of Levallois-Perret, France and SAP AG of Walldorf, Germany, provide components and tools that allow users to monitor, retrieve, view and manipulate business information, including business warehouse data stored and event streams maintained as part of a company's overall business intelligence tools. By way of examples only, business information might be associated with a number of different product lines, profit values, customer groups, fiscal years, distribution regions, product costs, product quantities, revenues, and/or dates. Moreover, the business information may be stored and retrieved in a variety of ways. Examples of data sources include real-time data streams, events coming through notifications, and databases (e.g., relational, transactional, hierarchical, multi-dimensional, and/or object oriented databases).

In some cases, a user may want to be presented with particular information under specific conditions. For example, a user might wish to be alerted when a current rate of production falls below a pre-determined value. Similarly, a user might want to access analytic information associated with an enterprise. Typically, a client device associated with the user (e.g., his or her computer) retrieves the desired information from a server. For example, the client device might poll the server every 10 milliseconds to retrieve the latest data by periodically issuing Standard Query Language (SQL) commands to "pull" information from a relational database.

Such an approach, however, can be impractical—especially when there are a relatively large number of users and/or data items that need to be processed. For example, it can be difficult to scale a client side pull-based architecture for hundreds of users when tens of thousands of events occur per second. Moreover, it can be difficult to process large amounts of data and provide appropriate indications to a large number of users with relatively low latency (e.g., a few milliseconds between the occurrence of an event and providing notifications to appropriate users).

It would be desirable to provide improved methods and systems that facilitate a presentation of business information by a user, including situations where there is a relatively large amount of data and/or a relatively large number of users.

DETAILED DESCRIPTION

Figure 1:
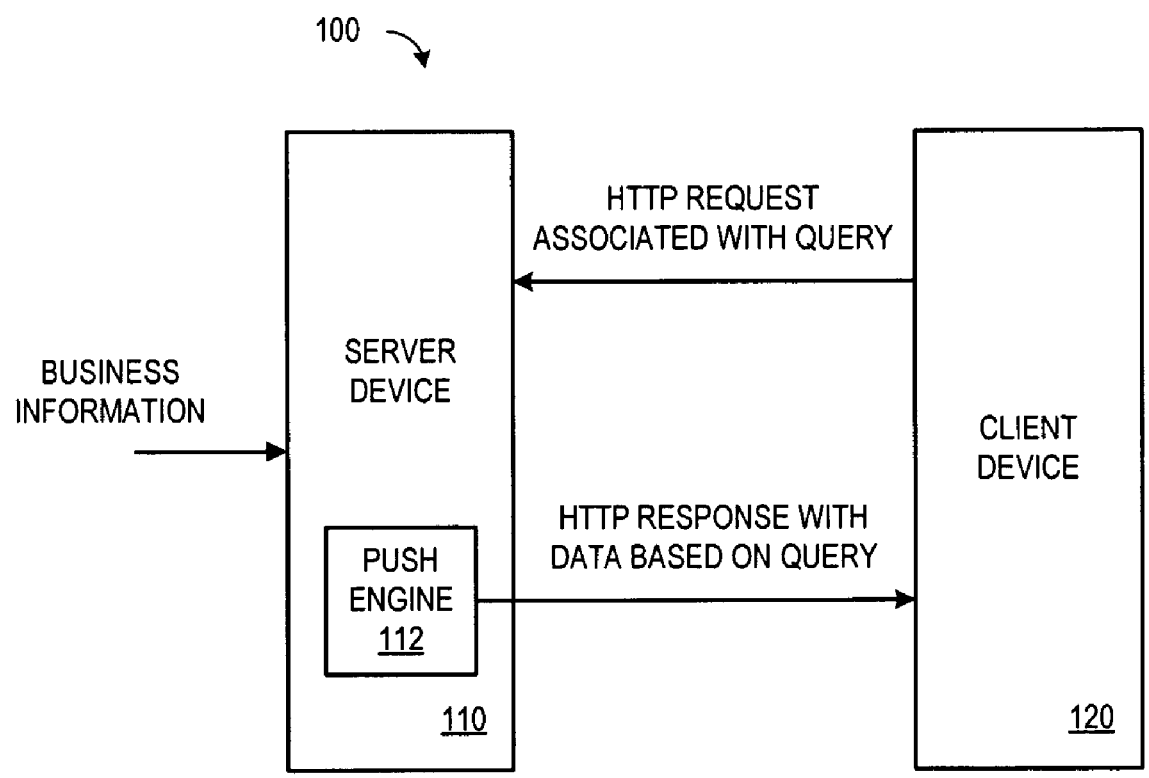
FIG. 1 is a block diagram of a system according to some embodiments of the present invention.

To alleviate problems inherent in the prior art, some embodiments of the present invention introduce systems, methods, computer program code and/or means to provide business information via a push model. For example, FIG. 1 is a block diagram of a system 100 according to some embodiments of the present invention. The system 100 includes a server device 110, such as a device that accepts HTTP requests and/or transmits HTTP responses in connection with an enterprise infrastructure. The server device 110 may also receive and/or determine "business information" associated with an enterprise. For example, the server device 110 may receive one or more streams of event data associated with an enterprise (e.g., sales volume data, profit information, and/or quality statistics).

The server device 110 may exchange information with one or more remote client devices 120 via a communication network. The client devices 120 might be associated with, for example, Personal Computers (PCs), portable computing devices such as a Personal Digital Assistants (PDAs), or any other appropriate storage and/or communication devices. As used herein, devices (including the server device 110 and client device 120) may exchange information via any communication network, such as a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

Although a single server device 110 and client device 120 are shown in FIG. 1, any number of such devices (and any other device described herein) may be included according to embodiments of the present invention. Moreover, in some embodiments, the server device 110 and client device 120 might be co-located and/or may comprise a single apparatus.

According to some embodiments, the client device 120 is adapted to display a desktop "widget" and/or a web analytic interface to a business user, or it can be running a rich Internet application that allows displaying dynamic business content. For example, a dashboard graphical component might display current sales information to a business user. Moreover, according to some embodiments a business user or system designer may define or select one or more "queries" to obtain business information of particular interest to the user. For example, a user might configure a dashboard display to provide a visual or audible alert when profit information associated with a particular region (e.g., Europe or Asia) falls below a pre-determined threshold level.

The client device 120 may send subscription information (e.g., including information about the particular query of interest to the user and some parameter like the threshold level) to the server device 110. For example, the client device 120 might send a Hypertext Transfer Protocol (HTTP) request associated with one or more queries to the server device 110. Typically, the server device 110 would immediately respond to the HTTP request issued by the client device 120.

According to some embodiments of the present invention, however, a "push engine" 112 associated with the server device 110 may instead block a connection with the client device 120 (e.g., by not transmitting an HTTP response to the client device 120) until a notification with some data corresponding to the query result is available. When the data is available (e.g., when the business information meets one or more conditions associated with the query), the push engine 112 may then transmit an HTTP response to the client device 120. The client device 120 would then display the data to the business user.

In an illustrative example, consider a manager of a delivery service who is interested in monitoring package delivery times and failures. In this case, he or she may configure a desktop widget on a client device 120 to provide an alert when the average time associated with today's deliveries falls below a target delivery time. The client device 120 might transmit an HTTP request to the server device 110 (including details of the manager's query), and the push engine 112 may block the server device 110 from responding to the request (e.g., because the relevant data is not yet available). The server device 110 may subscribe to the corresponding continuous query on the business information (e.g., one or more incoming event streams) and get notified when the condition associated with the user's continuous query is satisfied (e.g., when the average delivery time falls below the threshold value). Once notified, the push engine 1120 may allow an HTTP response to be transmitted to the client device 120 (which in turn would display an appropriate alert to the manager).

Figure 2:
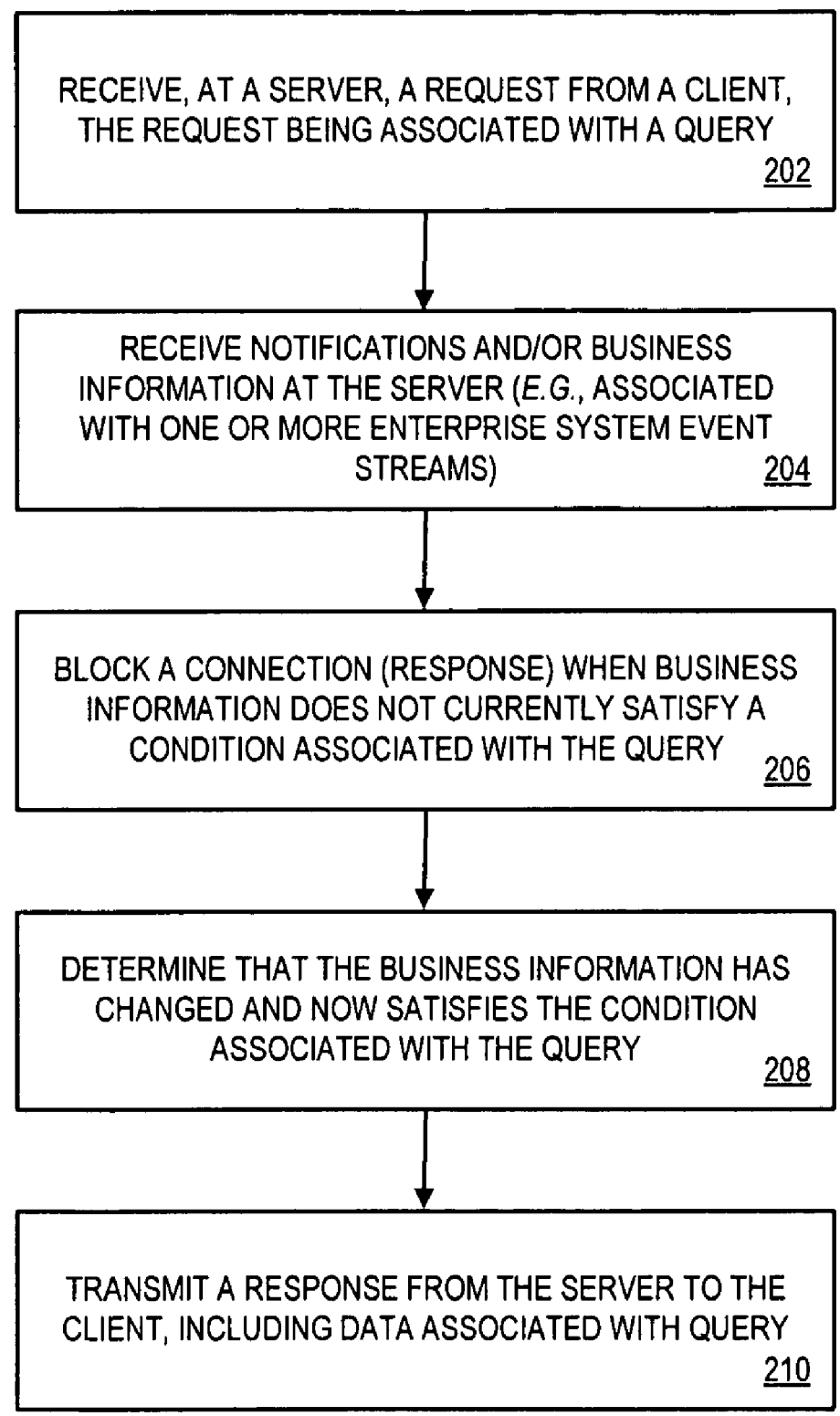
FIG. 2 is a flow diagram of a method to facilitate a presentation of information according to some embodiments.

Thus, according to some embodiments, a push engine 112 may be advantageously used by the system 100 to facilitate a presentation of business information to a user. For example, FIG. 2 is a flow diagram of a method that may be performed by the server device 110 of FIG. 1 according to some embodiments. The flow charts described herein do not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

At 202, a request from a client may be received at a server. The request may be, for example, an HTTP request associated with a user's query. At 204, business information is received at the server. According to some embodiments, the server may subscribe to a continuous query, using the user's parameters profile and security configuration. The server may then receive a notification when business information is available for that specific query of the user. In some cases, the server might receive one or more event streams associated with business information.

At 206, the server blocks a response to the received request based on a determination that the business information does not currently satisfy a condition associated with the query. According to some embodiments, this determination may comprise a determination that the server has not received a notification that business information is available in connection with the user's query. For example, the query might indicate that a factory supervisor is interested in being notified when either (i) production of a particular unit falls below a threshold level or (ii) a number of defective units being produced rises above another threshold level. In this case, the server might determine that neither condition is currently satisfied (e.g., no such notification has been received by the server) and, as a result, block transmission of a response to the HTTP request.

At 208, the server may determine that the business information has changed and now satisfies the condition associated with the query. According to some embodiments, this determination may comprise a determination that the server has now received a notification that business information is available in connection with the user's query. In other embodiments, the server itself might analyze an event stream and determine when business information is available. For example, a server might receive a notification that that the number of defective units being produced in a factory has risen above a threshold value. Based on this notification, the server transmits an HTTP response to the client (including new resulting data associated with the query) at 210. The client can then provide an indication to the business user (e.g., via a desktop widget, a web analytic application, a browser interface, and/or a wireless device).

Thus, some embodiments of the present invention may provide a "push model" wherein the server determines if (and when) information will be sent to the client. That is, the server may decide when the connection needs to be opened or closed (instead of having that decision being made periodically by the client). In some cases, the push model may represent a reversal of traditional HTTP logic by blocking an issued HTTP request from the client for an extended period of time.

Note that a server and client might not communicate directly. For example, a firewall or proxy device might be placed in between the server and the client for security reasons. Moreover, the firewall or proxy device might not permit a connection wherein an issued HTTP request from the client does not receive an HTTP response from the server for an extended period of time.

Figure 3:
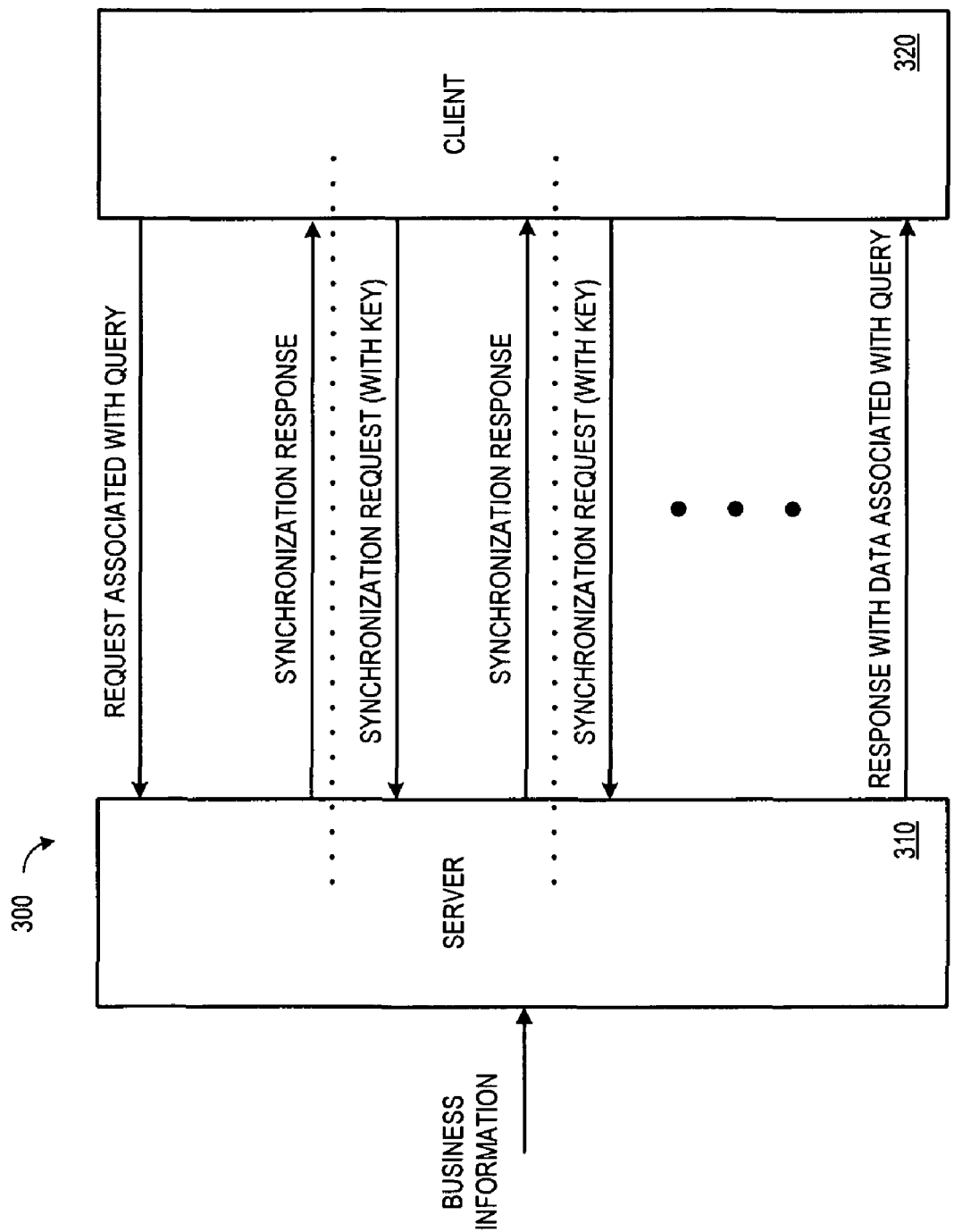
FIG. 3 is a block diagram of a system according to some embodiments of the present invention.

To address such a situation, FIG. 3 is a block diagram of a system 300 according to some embodiments of the present invention. As before, a client 320 may be adapted to display a desktop widget, dashboard, and/or a web analytic interface to a business user. Moreover, the business user (or system designer) may define or select one or more "queries" to obtain business information of particular interest. The client 320 may send subscription information (e.g., including information about the particular query of interest) to a server 310 in an HTTP request. In this way, the client 320 may attempt to initiate a connection with the server 310.

The server 310 may then determine that the existing business information does not satisfy one or more conditions associated with the query. For example, the server may determine that no notification has been received indicating that business information satisfies the conditions associated with the user's query and, as a result, block the connection and/or transmission of an HTTP response to the client 320.

According to this embodiment, the server 310 also initiates a countdown timer to measure how long the connection with the client has been blocked. When the timer expires, the server 310 transmits a synchronization message to the client 320. For example, the synchronization message may comprise an HTTP response that does not include real-time event data associated with the query (e.g., with respect to business information of interest to the user, the synchronization message may be "empty"). Moreover, the client device 320 may reply with its own synchronization message (e.g., another HTTP request). In this way, the system 300 may keep the pending connection between the server 310 and the client 320 alive even when a firewall or proxy is present (and when events do not satisfy the conditions of interest to the user for an extended period of time). After the synchronization messages are exchanged, the server 310 may re-initiate the countdown timer and the process may be repeated as required.

When data eventually becomes available (e.g., a notification arrives at the server indicating that one or more conditions associated with the query have been met), the server 310 may transmit an HTTP response to the client 320 including the updated data. The client 320 can then provide the data to the business user.

Figure 4:
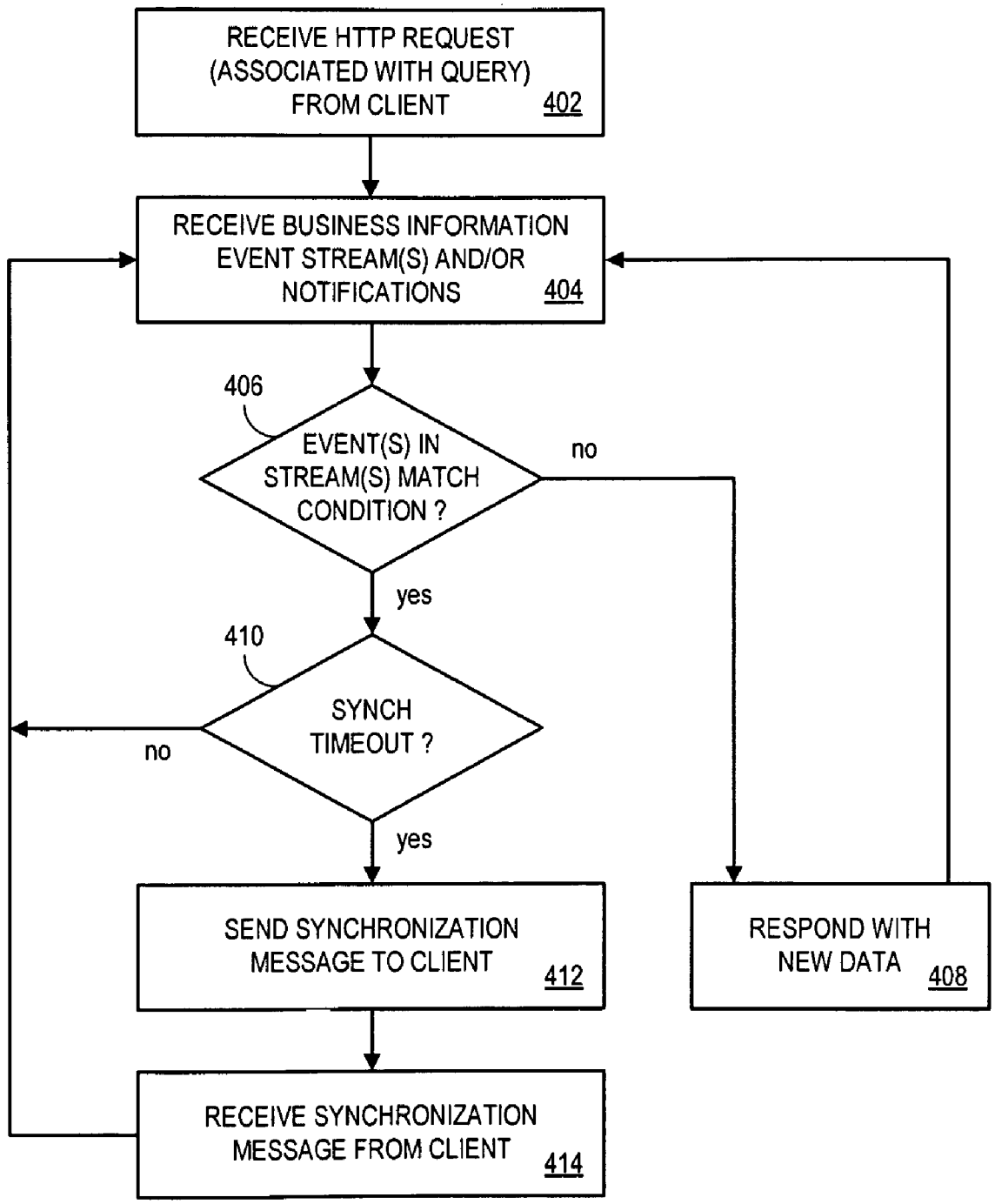
FIG. 4 is a flow diagram of a method including a synchronization mechanism according to some embodiments.

FIG. 4 is a flow diagram of a method including a synchronization mechanism according to some embodiments. At 402, a server may receive an HTTP request associated with the query from the client. The HTTP request may include, for example, subscription information such as a query identifier, an indication of a time-out period, and/or a client device identifier.

At 404, the server receives one or more business information event streams associated with an enterprise. According to some embodiments, the server receives notifications associated with such event streams. At 406, the server determines whether or not events in the streams match a condition associated with the received query. This determination may comprise, for example, a determination that no such notification has been received. If a match is found (e.g., the server is notified that a match exists), the server may simply transmit an HTTP response to the client's request at 408 and continue to monitor business information (e.g., by monitoring notifications) at 404.

If no match was found at 406 (e.g., no notification has been received), the server determines whether or not a synchronization timeout period associated with the query has expired at 410 (e.g., a timeout period defined by the subscription information received from the client). If the synchronization timeout period has not expired, the server continues to monitor business information at 04 (e.g., by waiting to receive a notification). According to some embodiments, the synchronization period may be a pre-defined amount of time (e.g., 100 milliseconds). Note, however, that other types of periods may be used instead (e.g., a synchronization period may represent the occurrence of 100 events).

If the synchronization timeout period has expired, the server may transmit a synchronization message to the client at 412 (e.g., even though the message will not contain information responsive to the user's query) and receive a synchronization message from the client at 414. According to some embodiments, a synchronization message may include a synchronization security key, such as a token that has been assigned to a particular query or client device. In some cases, a synchronization message may include time-stamp information to help the server and client remain synchronized. After the synchronization messages are exchanged at 412 and 414, the server may re-set the synchronization timeout period and continue to wait for business events (e.g., waiting for a notification) at 404.

A client may be interested in the occurrence of a single type of event. For example, a manager might wish to monitor a running count of a number of units that have been sold during the day. In this case, a server might update the client every time 50 or more units have been sold, after every 10 sales events have occurred, and/or on a periodic basis (e.g., every five minutes).

Note that a single client may be interested in the occurrence of several different types of events. For example, a business user might wish to be notified when sales volume in a geographic region falls below a threshold value, when a number of complaints about an item being sold rises above a particular level, or when products are being returned at rates higher than historical averages. Thus, a number of different queries may be transmitted from a client to server (and be pending with the server simultaneously).

Figure 5:
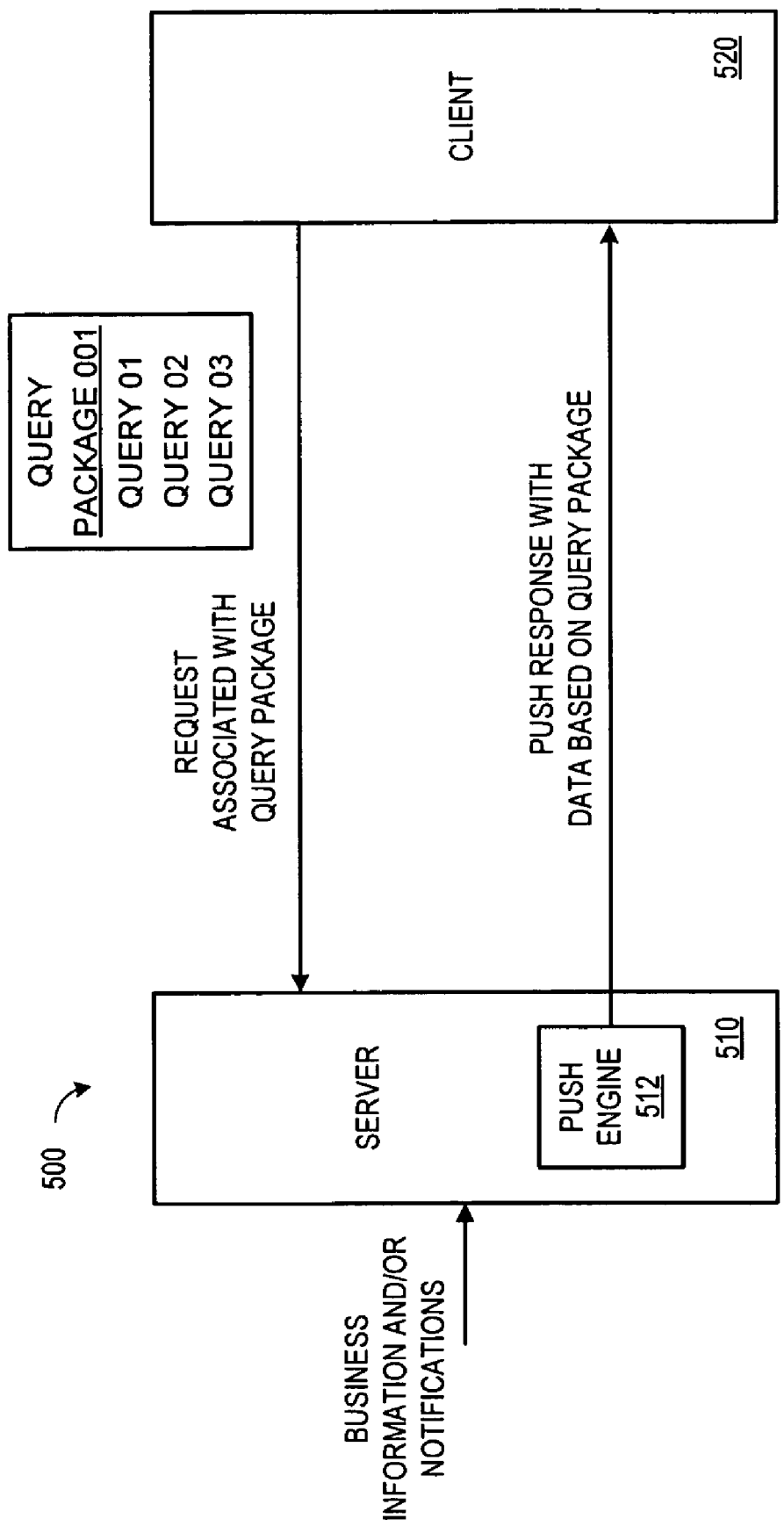
FIG. 5 is a block diagram of a system according to some other embodiments of the present invention.

In some cases, however, the number of HTTP connections available between a single client and a server may be limited. For example, a particular client implementing HTTP 1.1 protocol (Request For Comment (RFC) document 2616, paragraph 8.1.4) will be limited to two HTTP connections with the server. To address this situation, FIG. 5 is a block diagram of a system 500 according to some other embodiments of the present invention. As before, a client 520 may be adapted to display a desktop widget, dashboard, and/or a web analytic interface to a business user.

The business user (or system designer) may create a plurality of queries to obtain business information, and the client 520 may send subscription information to a server 510 in an HTTP request to initiate a connection. According to this embodiment, the request transmitted from client 520 to the server 510 is associated with a query "package." That is, the single request may be associated with a number of different queries. The query package may be defined, for example, by a system design and/or a business information user and may tunnel multiple individual queries into a single web services call. As used herein, the phrase "web service" may refer to, for example, a software system designed to support interoperable machine-to-machine interactions over a network.

A push engine 512 at the server 560 may determine that the existing business information does not satisfy any of the queries associated with the query package (e.g., by determining that no such notification has been received) and, as a result, block the connection and/or transmission of an HTTP response to the client 520. When data eventually becomes available (e.g., a notification is received indicating that a new event satisfies one or more queries in the package), the server 510 may transmit an HTTP response to the client 520 including the updated data. The client 520 may then provide the data to the business user.

By using a query package, the need for extra HTTP connections between a single client and a server may be avoided. According to some embodiments, a query package may be stored in an enterprise platform repository. Moreover, information about the query package may include metadata (e.g., an appropriate name, description, and/or list of individual query identifiers associated with the package). Such an approach may also let multiple components of, for example, a dashboard display be updated at substantially the same time.

Figure 6:
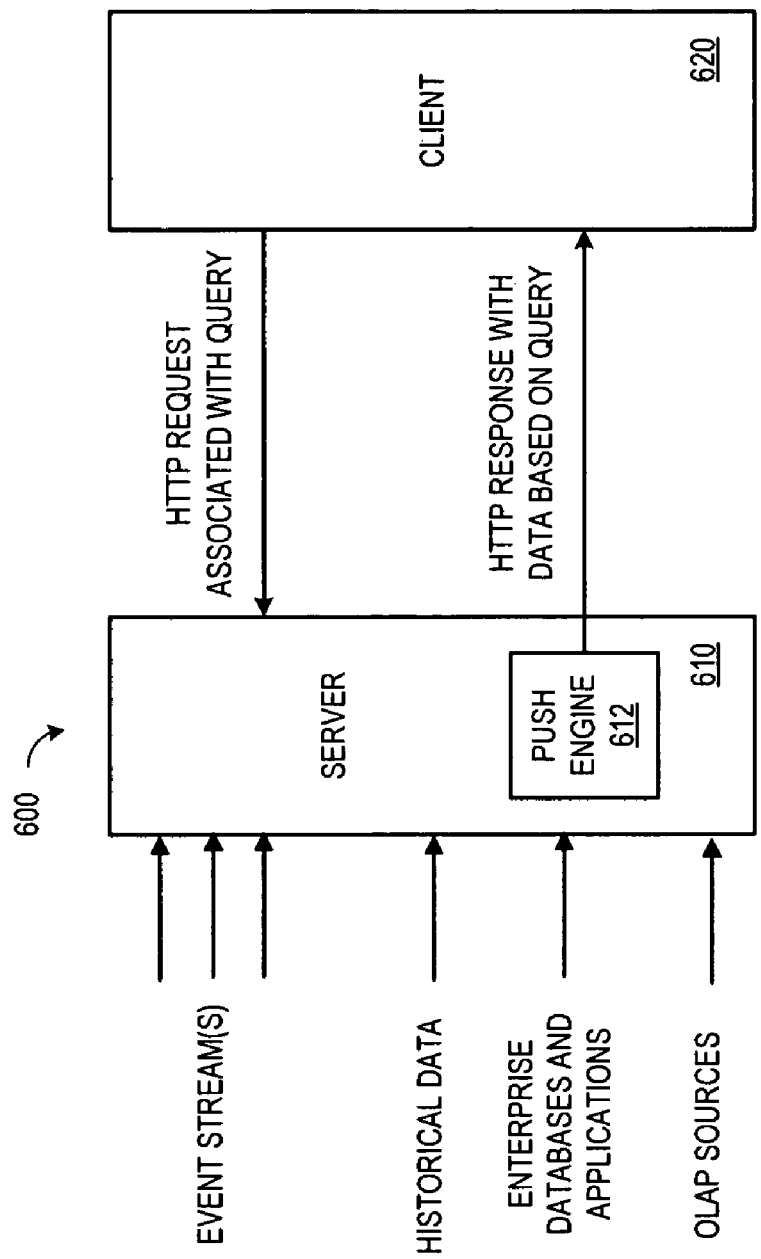
FIG. 6 is a block diagram of a system according to still another embodiment of the present invention.

FIG. 6 is a block diagram of a system 600 according to still another embodiment of the present invention. As before, a server 610 with a push engine 612 may implement a push model to deliver information to a client 620. In this case, the business information received at the server 610 is one or more business enterprise system event streams. The event streams may represent a substantially large number of events that occur at a relatively high rate (e.g., thousands of events might occur each second). The query provided from the client 620 to the server 610 might be associated with, for example, the occurrence of a particular event in the stream.

According to some embodiments, the query might be associated with a number of different events and/or different types of events (associated with one or more event streams). In this case a condition associated with a query may be further associated with a rule (e.g., event one occurs before event two), a logical operation (e.g., a Boolean operations such as event one and event two exist at the same time), or a formula (e.g., a value associated with event one exceeds a value associated with event two by fifty percent). Moreover, the push engine 612 might employ complex event processing by looking for patterns among the multiple streams of event data, finding event correlations, and/or by performing event filtering tasks.

Note that the business information notifications and/or events can contain data that comes from additional data sources. For example, the server might receive historical information related to the business information (e.g., prior sales figures), data from enterprise databases and applications, and/or information from Online Analytic Programming (OLAP) sources.

Figure 7:
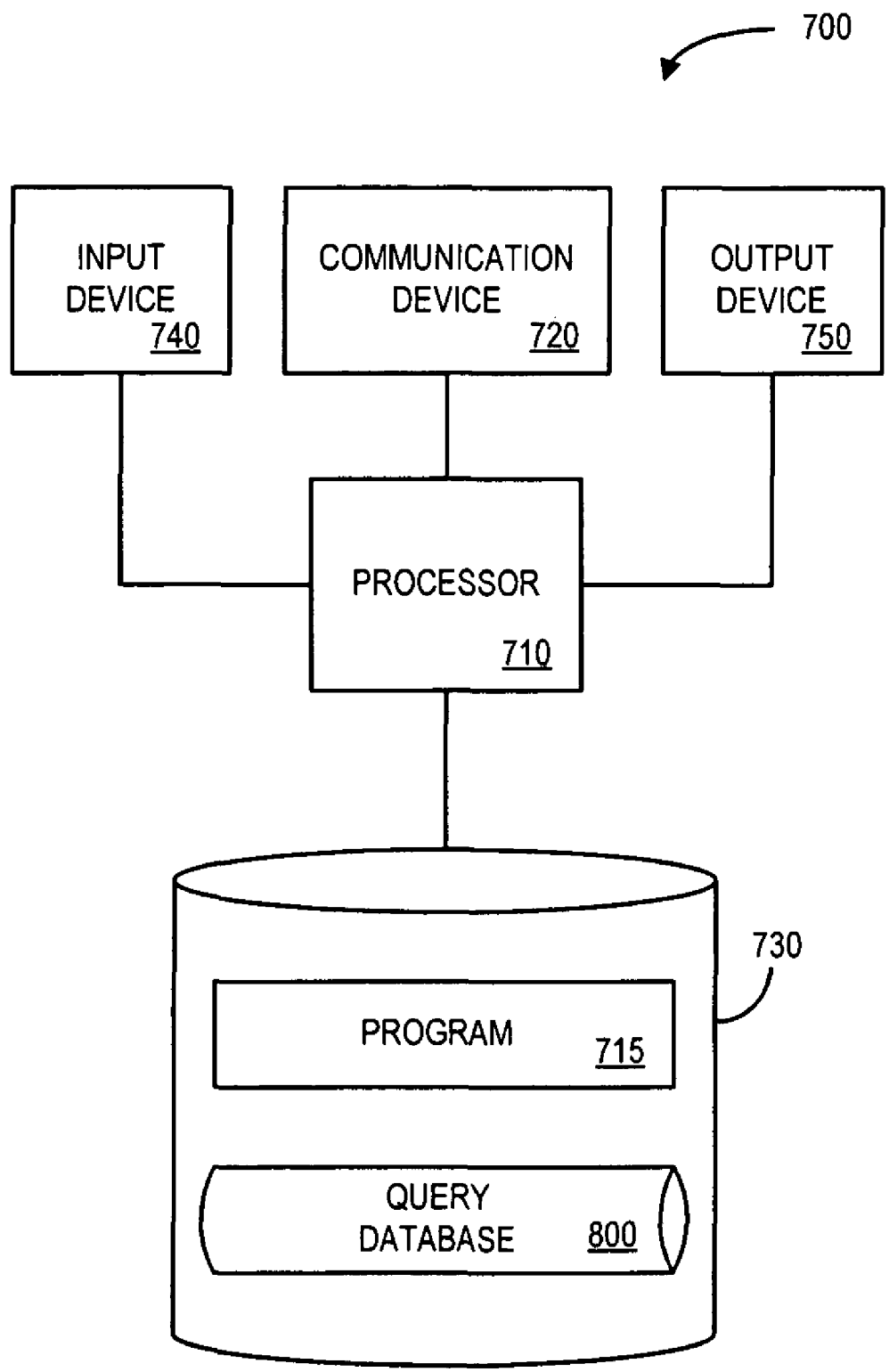
FIG. 7 is a block diagram of an apparatus in accordance with some embodiments of the present invention.

FIG. 7 is a block diagram of an apparatus 700 in accordance with some embodiments of the present invention. The apparatus 700 might, for example, be associated with a server such as the server device 110 illustrated in FIG. 1. The apparatus 700 comprises a processor 710, such as one or more INTEL® Pentium® processors, coupled to a communication device 720 configured to communicate via one or more communication networks (not shown in FIG. 7). The communication device 720 may be used to exchange information with one or more client devices and/or event stream sources.

The processor 710 is also in communication with an input device 740. The input device 740 may comprise, for example, a keyboard, a mouse, or computer media reader. Such an input device 740 may be used, for example, to define queries and/or query packages. The processor 710 is also in communication with an output device 750. The output device 750 may comprise, for example, a display screen or printer. Such an output device 750 may be used, for example, to provide reports and/or displays associated with queries and/or query packages.

The processor 710 is also in communication with a storage device 730. The storage device 730 may comprise any appropriate information storage device, including combinations of magnetic storage devices (e.g., hard disk drives), optical storage devices, and/or semiconductor memory devices such as Random Access Memory (RAM) devices and Read Only Memory (ROM) devices.

The storage device 730 stores a program 715 for controlling the processor 710. The processor 710 performs instructions of the program 715, and thereby operates in accordance any embodiments of the present invention described herein. For example, the processor 710 may receive an HTTP request from a remote client, the received HTTP request being associated with both a query and a timeout period. The processor 710 may further receive notifications based on at least one event stream associated with business information. For example, the processor 710 may receive a notification from complex event processing engine when an event stream satisfies a condition associated with the user's query.

According to some embodiments, the processor 710 may block a connection with the remote client based on a determination that event streams do not currently satisfy a condition associated with the query (e.g., when no notification has been received by the processor 710). Moreover, the processor 710 may initiate a countdown process based on the timeout period associated with the received hypertext transfer protocol request. When the processor 710 determines that the timeout period has expired, a synchronization response may be transmitted to the client (and the message will not include event data associated with the query). Moreover, the processor 710 may receive a synchronization message from the client, including a synchronization token. When the processor 710 eventually determines that an event stream now satisfies the condition associated with the query (e.g., the processor 710 receives such a notification), an HTTP response may be transmitted to the remote client (including event data associated with the query).

As used herein, information may be "received" by or "transmitted" to, for example: (i) the apparatus 700 from other devices; or (ii) a software application or module within the apparatus 700 from another software application, module, or any other source. As shown in FIG. 7, the storage device 730 may also store a query database 800 (described with respect to FIG. 8) according to some embodiments. The illustration and accompanying descriptions of devices and databases presented herein are exemplary, and any number of other arrangements could be employed besides those suggested by the figures. For example, multiple databases associated with different types of business information and/or clients might be associated with the apparatus 700.

Figure 8:
FIG. 8 is a tabular representation of a portion of a query database according to some embodiments.

FIG. 8 is a tabular representation of a portion of a query database 800 according to some embodiments. The table includes entries identifying queries that have been received from remote client devices. The table also defines fields 802, 804, 806, 808, 810 for each of the entries. The fields specify: a query identifier 802, client identifier 804, event condition 806, a timeout period 808, and a current elapsed time 810. The information in the database 800 may be created and updated based on information received from client devices and/or system designers.

The query identifier 802 may be, for example, an alphanumeric code associated with a particular subscription query (or query package) received from a client. The client identifier 804 may be, for example, an alphanumeric code associated with the client who is subscribing to the query, a Uniform Resource Locator (URL) address associated with the client, a key, a token, or a user name and password. The event condition 806 may define when information should be "pushed" to the client. The timeout period 808 may define an amount of time between synchronization messages, and the current elapsed time 810 may represent how long it has been since synchronization messages were last exchanged (e.g., when the current elapsed time 810 equals the timeout period another synchronization message may be required).

Figure 9:
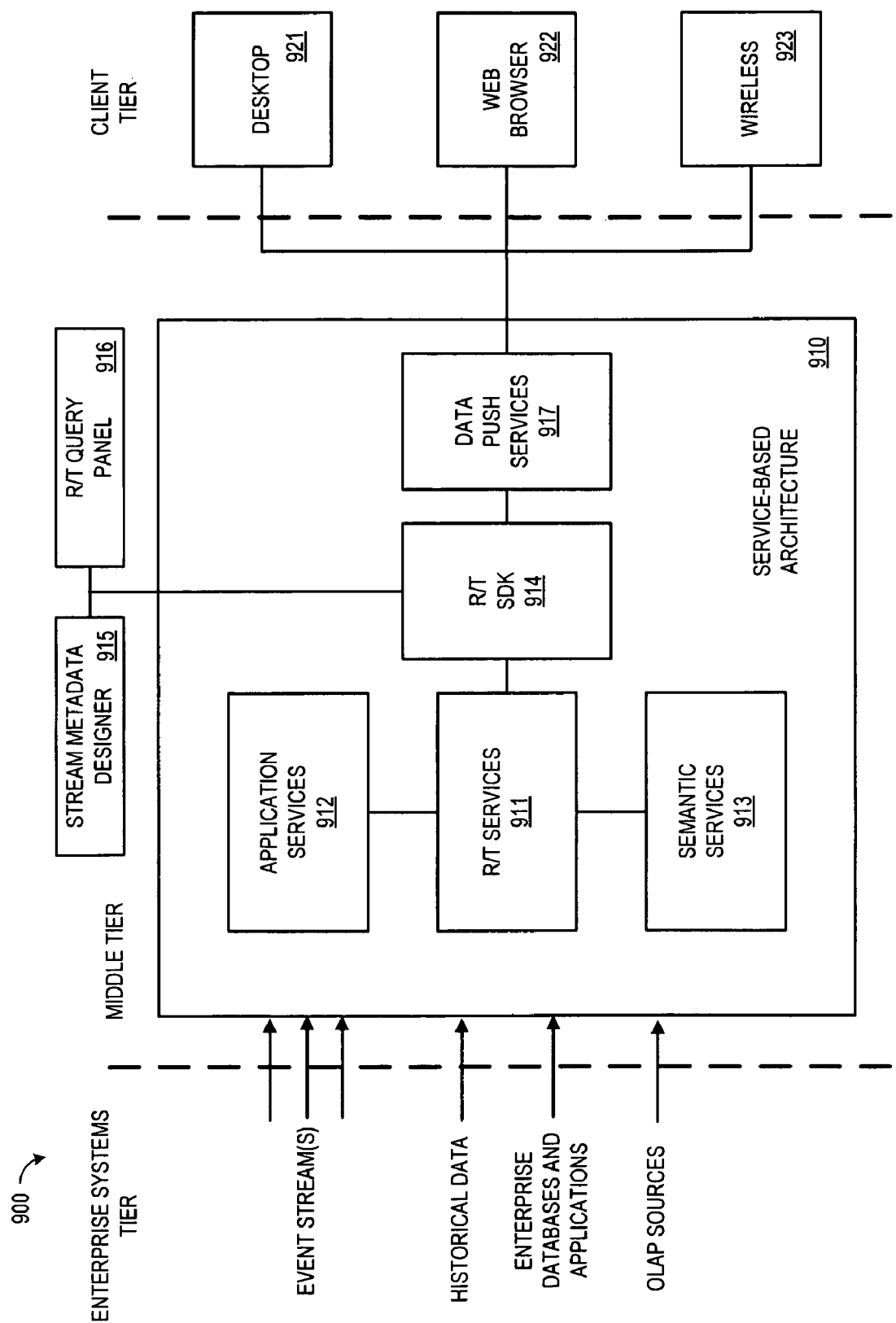
FIG. 9 is a block diagram of a system according to an exemplary embodiment of the present invention.

FIG. 9 is a block diagram of a system 900 according to an exemplary embodiment of the present invention. According to this embodiment, at least one enterprise systems tier or component may be adapted to provide at least one Real Time (R/T) business information event stream to a middle tier (e.g., including a service-based architecture 910). Moreover, the event streams may be associated with one or more event stream adapters that provide data to an event driven engine. The event driven engine may, in turn, provide data to a R/T web server to be distributed to various remote clients 921, 922, 923 in a client user interaction tier or component.

The service-based architecture might further receive historical data (e.g., to be used to correlate and compare with R/T data), information from enterprise databases and applications, and/or data from OLAP sources (e.g., associated with a multi-dimensional data schema such as a hypercube). Note, however, that embodiments may be associated with other types of information including data described by a metadata model. Such data may also include information stored in one or more data sources, such as relational databases.

A client user interaction tier or component may be adapted to transmit a HTTP request to the service-based architecture 910 in connection with a query associated with one or more events in the at least one real-time business information event stream. Examples of devices in the client tier may include a desktop 921 (e.g., a dashboard or widget running at a PC), a web browser 922, and a wireless device 923.

The service-based architecture 910 may receive the R/T business information event stream and an HTTP request (e.g., a subscription query) from a client device. The service-based architecture 910 may also include data push services 917 (e.g., associated with HTTP polling and web services) that block a connection with the client device when a condition associated with the query is not currently satisfied by the R/T business information event stream. The data push services 912 may further push R/T business information to a client device, using a hypertext transfer protocol response, when the condition associated with the query is subsequently satisfied by the R/T business information event stream.

The service based architecture 910 may include a number of business services nodes, such as R/T services 911 (e.g., to process historical and stream-based information), application services 912 (e.g., to provide security, session, and administrative functions), and semantic services 913. According to some embodiments, a web query may be defined using semantic layer objects and/or interfaces contained in the definitions of event streams The service based architecture 910 may further include a number of application server container components, such as a R/T Software Development Kit (SDK) 914 (e.g., including an authoring component and an event driven analytics alerts component). According to some embodiments, the R/T SDK operations in connection with a stream metadata designer 915 and/or a R/T query panel 916 to facilitate the definition of queries and/or query packages.

According to some embodiments, the service-based architecture 910 may request parameters from a client. For example the service-based architecture 910 may request token information (allowing the server to uniquely identify the client), timeout information (specifying a maximum time permitted for the server to block the connection with the client), a query package identifier (allowing the server to identify appropriate queries as described with respect to FIG. 5), and/or a list of query input objects (each object including, for example, a timestamp to let the server synchronize with the client, an output limit specifying a rate at which the server may send events to the client, and/or a list of values for each prompt of the query that were specified by a particular user). The service-based architecture 910 may also send to the client a list of query output objects (each object including, for example, a timestamp to let the client synchronize with the server and/or a data table listing the events that correspond to the user query).

Figure 10:
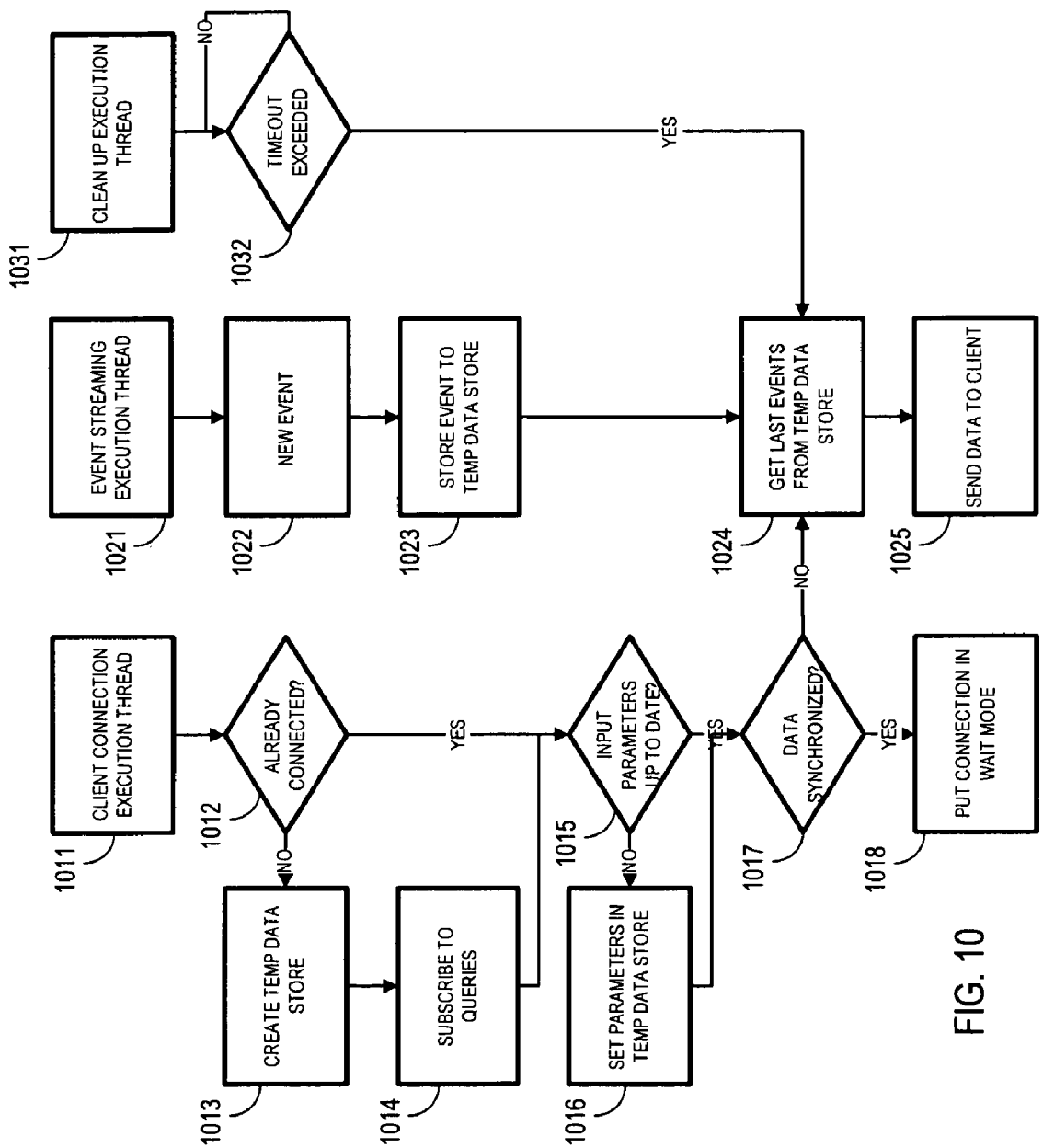
FIG. 10 is a flow diagram of a server-side method according to some embodiments.

FIG. 10 is a flow diagram of a server-side method that might be performed at the service-based architecture 910 of FIG. 9 according to some embodiments. At 1011, a client connection execution thread may run in connection with a R/T web server function. At 1012, the server may determine whether or not the client is already connected to the server. If not, a temporary data store is created for the client at 1013, and query subscriptions are processed at 1014 (e.g., in connection with a query package).

At 1015, the server determines if the input parameters are currently up to date. If not, the appropriate parameters are set in the temporary data store at 1016. The server then determines if the data is currently synchronized with the client at 1017. If the data is synchronized, the connection is placed in a wait mode at 1018. If the data is not currently synchronized, the last events are retrieved from that client's temporary data store at 1024 and are then sent to the client at 1025.

At 1021, an event streaming execution thread may run in connection with the R/T web server function. In particular, a new event occurs at 1022, and the event is placed in the temporary data store at 1023. The last events may then be retrieved from the temporary data store at 1024 and sent to the client at 1025.

According to some embodiments, a cleanup execution thread may run in connection with the R/T web server function at 1031. In this case, it is determined if a timeout period has been exceed at 1032 (e.g., a synchronization timeout period). If so, the last events are retrieved from the temporary data store at 1024 and sent to the client at 1025.

Figure 11:
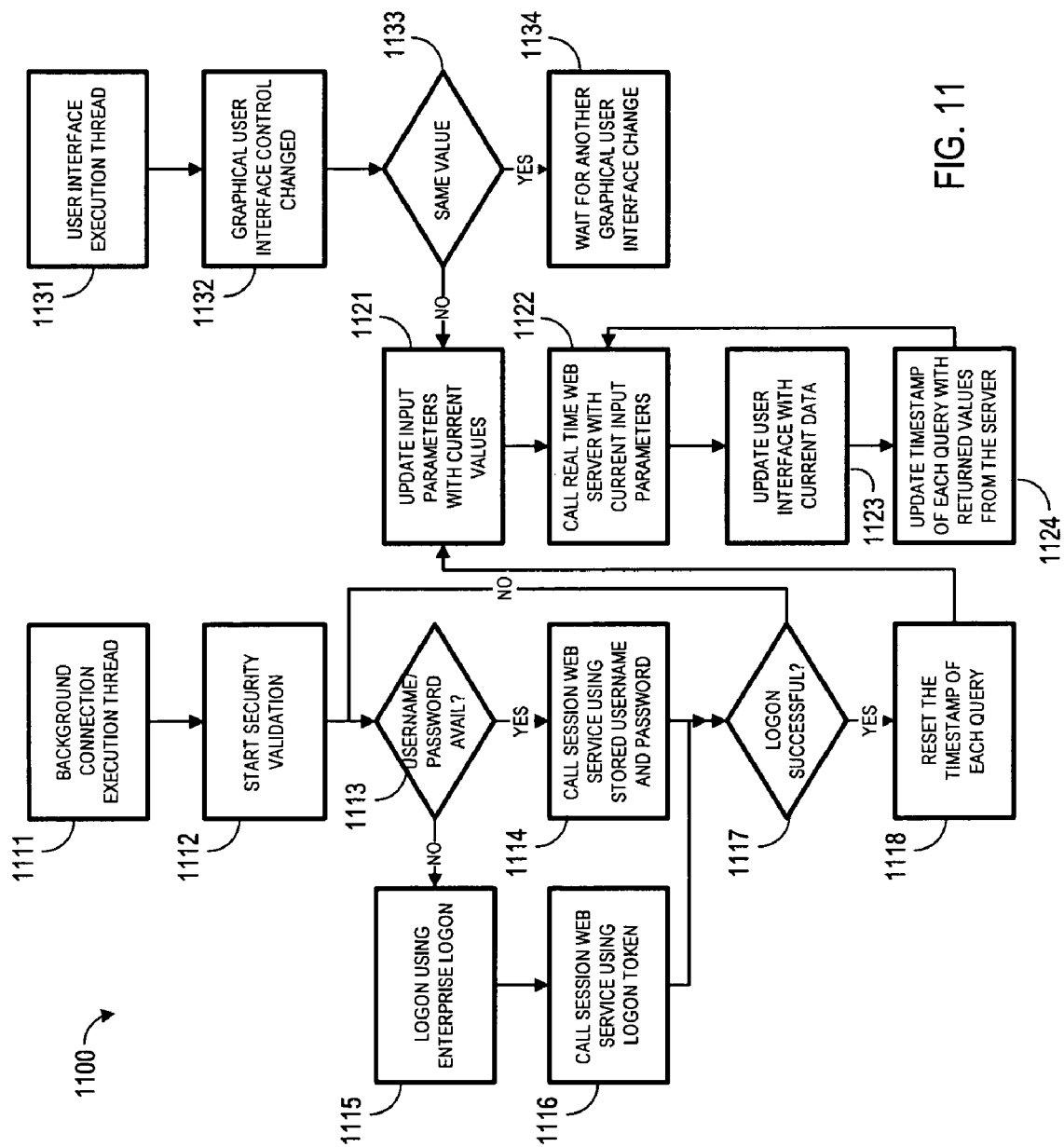
FIG. 11 is a flow diagram of a client-side method according to some embodiments.

FIG. 11 is a flow diagram of a client-side method that might be performed at the client tier in the system 900 of FIG. 9 according to some embodiments. At 1111, a background connection execution thread may run in connection with a client side function. At 1112, a security validation process is started, and it is determined whether or not a user name password are available at 1113. If no user name and password are available, a logon process is performed (e.g., using an enterprise login process) at 1115, and a session web service is called using a logon token at 1116. If a user name and password were available, a session web service is called using the user name and password at 1114. If the logon process is not successful at 1117, the process repeats at 1113.

When the logon process is successful, the timestamp associated with each query is reset at 1118. The input parameters are updated with current values at 1121, and a R/T web server is called with the current input parameters at 1122 (e.g., subscribing to the appropriate queries). The user interface may also be updated with the current data at 1123 (e.g., in connection with a widget or dashboard display). At 1124, the timestamp of each query is updated with values returned from the server, and the process repeats at 1122.

At 1131, a user interface execution thread may run in connection with the client side function. In particular, it is determined at 1132 that a Graphical User Interface (GUI) control has changed. If the value is the same (as a previous value) at 1133, the process waits for another GUI change at 1134. If the value is not the same at 1133, the process continues by updating the input parameters with the new values at 1121.

Figure 12:
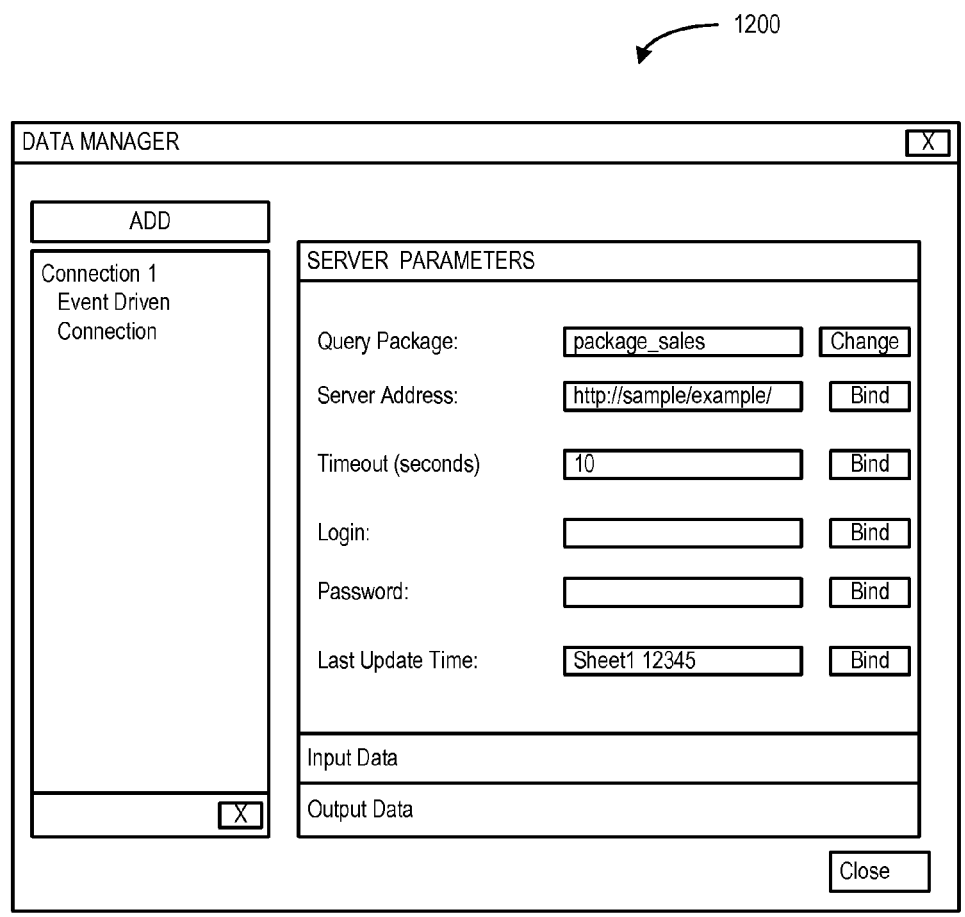
FIG. 12 illustrates a graphical user interface in accordance with some embodiments.

FIG. 12 illustrates a GUI display 1200 that might be used to change input parameters in accordance with some embodiments. The display 1200 might be associated with, for example, a data manager adapted to add an event driven connection by defining server parameters such as a query package name or identifier, a server address (e.g., a URL address), a timeout period (e.g., in seconds), login user name and/or password, and an indication of a time when the data was last updated. The display 1200 may further define input and/or output data associated with the connection (e.g., the subscription parameters).

As a result of embodiments described herein, a push model may be implemented to provide business information to a user. Moreover, the sever may process information using an end-to-end event driven architecture such that information is pushed to a user with relatively little latency. Embodiments may also be scalable (e.g., thousands of users might be supported by a server), provide stream filtering on the server side, and/or ensure that a client receives only the data of interest to a user.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware, process steps, and data configurations have been described herein, note that other techniques may be provided in accordance with embodiments of the present invention (e.g., some of the data associated with the applications and databases described herein may be combined or stored in separate systems). Similarly, although a particular information flow and user interactions have been given as examples, other approaches may be implemented. For example, a response transmitted from a server to a client might be associated with an incremental change in data (as compared to a previously transmitted response).

Applicants have discovered that embodiments described herein may be particularly useful in connection with enterprise business information (e.g., the embodiments might be implemented without major changes to an enterprise infrastructure). Note, however, that other types of event streams and databases might similarly benefit from various embodiments, including those associated with systems that process large amounts of financial information.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A non-transitory computer-readable medium having stored thereon processor-executable instructions, to facilitate presentation of business information to a business user, that when executed by a processor result in the following:
    receiving, at a server, a HyperText Transfer Protocol (HTTP) request from a client, the received HTTP request including a query and a condition associated with the query, the condition including a threshold value associated with a business parameter;
    blocking, at the server, an HTTP response to the received HTTP request when a current value associated with the business parameter within a stream being received by the server does not currently satisfy the threshold value of the condition associated with the query;
    receiving, at the server, a notification that the current value associated with the business parameter within the stream now satisfies the threshold value of the condition associated with the query;
    responsive to the received notification, transmitting an HTTP response to the previously received HTTP request, from the server to the client, the HTTP response including data associated with the query;
    determining, at the server, that a synchronization period associated with a pending HTTP request from a client has expired;
    transmitting a synchronization HTTP response to the client; and
    receiving, at the server, a synchronization HTTP response from the client, wherein the synchronization HTTP response includes a synchronization security key.

2. The medium of claim 1, wherein the HTTP request received at the server comprises a query package associated with a plurality of queries.

3. The medium of claim 1, wherein business information received at the server comprises a subscription based notification associated with at least one business enterprise system event stream.

4. The medium of claim 3, wherein the condition associated with the query further comprises an occurrence of an event.

5. The medium of claim 2, wherein the condition associated with the query is further related to a plurality of events.

6. The medium of claim 5, wherein the condition is further associated with at least one of: (i) a rule, (ii) a logical operation, or (iii) a formula.

7. The medium of claim 1, wherein the HTTP request received by the server is associated with at least one of: (i) a web service associated with the client, (ii) a desktop widget application associated with the client, (iii) a dashboard application associated with the client, (iv) a web analytic application associated with the client, or (v) a web browser application associated with the client.

8. The medium of claim 1, wherein the HTTP response transmitted from the server to the client is associated with a push-based notification transmitted to at least one of: (i) a remote personal computer, or (ii) a remote wireless device.

9. The medium of claim 1, wherein the HTTP response transmitted from the server to the client is associated with incremental information as compared to a previously transmitted HTTP response.

10. The medium of claim 1, wherein the condition associated with the query is defined by a business user in connection with at least one real-time data source via a semantic layer interface.

11. A system, comprising:
    at least one enterprise system device configured to provide at least one real-time business information event stream;
    a client user interaction device configured to transmit a HyperText Transfer Protocol (HTTP) request in connection with a query associated with one or more events in the at least one real-time business information event stream, the HTTP request including the query and a condition associated with the query, the condition including a threshold value associated with a business parameter;
    a service-based architecture device to receive (i) notifications associated with the at least one real-time business information event stream and (ii) the HTTP request, the service-based architecture device being configured to:
        block an HTTP response to the client user interaction component when the threshold value of the condition associated with the query is not currently satisfied by a current value associated with the business parameter within the at least one real-time business information event stream, push real-time business information to the client user interaction device, using an HTTP response, when the threshold value of the condition associated with the query is subsequently satisfied by the current value associated with the business parameter within the at least one real-time business information event stream, determine that a synchronization period associated with a pending HTTP request from the client user interaction device has expired;

transmit a synchronization HTTP response to the client user interaction device; and receive a synchronization HTTP response from the client user interaction device, wherein the synchronization HTTP response includes a synchronization security key.

12. A method, comprising:

receiving, at a server, a HyperText Transfer Protocol (HTTP) request from a client, the received HTTP request being associated with a query and a timeout period, the query including a condition and threshold value associated with a business parameter;

blocking, at the server, an HTTP response to the client based on a determination that a current value of the business parameter within at least one event stream does not currently satisfy the threshold value of the condition associated with the query;

initiating, at the server, a countdown process based on the timeout period associated with the received HTTP request;

determining, at the server, that the timeout period has expired;

transmitting a synchronization response to the client in response to the expiration of the timeout period, the synchronization response not including event data associated with the query;

receiving, at the server, another message from the client, including a synchronization token;

determining, at the server, that the current value of the business parameter within the at least one event stream now satisfies the threshold value of the condition associated with the query;

responsive to the determination that the current value of the business parameter within the at least one event stream now satisfies the threshold value of the condition associated with the query, transmitting HTTP response from the server to the client, the HTTP response including event data associated with the query;

determining, at the server, that a synchronization period associated with a pending HTTP request from a client has expired;

transmitting a synchronization HTTP response to the client; and receiving, at the server, a synchronization HTTP response from the client, wherein the synchronization HTTP response includes a synchronization security key.

* * * * *